UNITED STATES PATENT OFFICE.

WILLIAM L. O'KELLY, OF LONG BEACH, CALIFORNIA.

COMPOSITION OF MATTER FOR WATERPROOFING POROUS SURFACES.

1,107,545.

Specification of Letters Patent. Patented Aug. 18, 1914.

No Drawing. Application filed January 3, 1914. Serial No. 810,167.

*To all whom it may concern:*

Be it known that I, WILLIAM L. O'KELLY, a citizen of the United States, residing at Long Beach, California, have invented a new and useful Composition of Matter for Waterproofing Porous Surfaces, of which the following is a specification.

This invention comprises a composition of matter the ingredients of which coöperate with each other to produce a fluid which, when applied to brick walls, plaster, cement, and other porous surfaces forms a coating impervious to water and to liquids in general.

One object of the invention is to provide a composition of the character stated that will not change the color or appearance of the surface to which it is applied. After a brick wall, for example, has been treated with this composition, there is no noticeable difference in the appearance of the brick except that the surface of the wall is rendered slightly glossy in appearance. The invention, however, is not limited to a colorless mixture, but various pigments may be added to color the same as desired.

This composition of matter is formed by mixing together the following ingredients in substantially the proportions stated: one gallon sweet milk (preferably unskimmed), two ounces rock salt, one ounce of alum, 1 and ¼ ounces liquid formaldehyde. The alum thickens the mixture, the salt keeps it from becoming dry or crusty after being applied to the surface coated; the formaldehyde keeps the milk from souring.

By the use of both salt and alum in the mixture in substantially the proportions stated an improved result is obtained by reason of the salt counteracting the tendency of the alum to form an undesirable scaly crust on the coated surface. Thus the thickening function of the alum is retained and at the same time the undesirable crusty formation eliminated.

I claim:

1. A composition of matter for waterproofing consisting of a mixture of uncoagulated milk, rock salt, alum, and formaldehyde in about the following proportions: one gallon milk; two ounces rock salt; one ounce alum; one and one-fourth ounces of formaldehyde.

2. A composition of matter consisting of a mixture of sweet milk, a preservative sufficient in quantity to keep the milk from souring, and approximately one ounce of alum and two ounces of salt to each gallon of milk.

In testimony whereof I have hereunto signed my name in the presence of two subscribing witnesses at Los Angeles, in the county of Los Angeles and State of California, this 29th day of December, 1913.

WILLIAM L. O'KELLY.

Witnesses:
 ALBERT H. MERRILL,
 M. JENNIE CUTSHAW.